Figure 1:
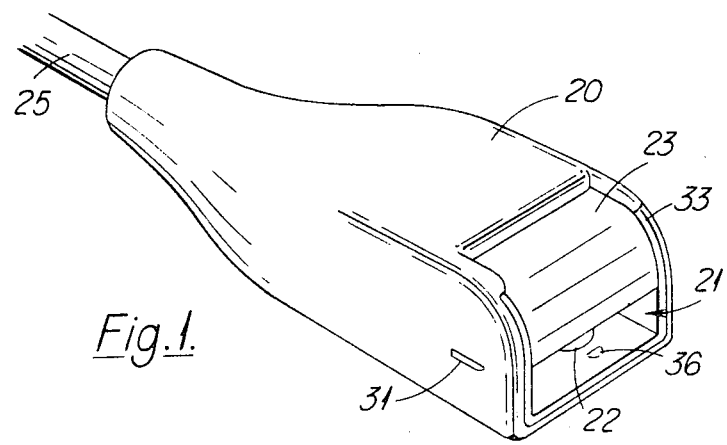

United States Patent [19]

Esner

[11] 3,722,909
[45] Mar. 27, 1973

[54] VEHICLE SAFETY BELTS AND HARNESSES AND BUCKLES FOR THEM

[75] Inventor: Mark Edward Esner, London, England

[73] Assignees: Dynasafe Equipment Limited; Howard Wall Limited, both of London, England

[22] Filed: Feb. 12, 1971

[21] Appl. No.: 115,030

[30] Foreign Application Priority Data

Feb. 12, 1970 Great Britain..................6,812/70

[52] U.S. Cl...................280/150 SB, 24/230 AK
[51] Int. Cl..............................B60r 21/10
[58] Field of Search............280/150 SB; 24/230 AK

[56] References Cited

UNITED STATES PATENTS

| | | | |
|---|---|---|---|
| 3,321,244 | 5/1967 | Davies | 280/150 SB |
| 3,467,995 | 9/1969 | Hopka | 24/230 AK |
| 2,349,109 | 5/1944 | O'Keeffe | 280/150 SB |
| 3,399,431 | 9/1968 | Shanklin | 24/230 AK |
| 3,317,243 | 5/1967 | Weman | 280/150 SB |
| 2,775,288 | 12/1956 | Anastasia | 280/150 SB |

Primary Examiner—Kenneth H. Betts
Assistant Examiner—Robert R. Song
Attorney—Shoemaker & Mattare

[57] ABSTRACT

A safety belt or harness for a vehicle includes a two part buckle of which one part comprises a plate with an aperture and the other part comprises a unit having a bump on which the aperture in the plate fits, one end of the unit consisting of the end of a slidable member which holds the two parts of the buckle together and a mouth where the plate enters the unit. The slidable member is moved by hand to release the plate, and by hand or by the end of the plate when the plate is inserted into the unit. The slidable member slides on a channel housed within the unit, the channel having a hole by which the unit can be attached to a bracket or cable connected to the vehicle. Adjustment of the belt or harness can be by single or double snubbers carried by the plate or the harness straps or the vehicle fixtures. For adjacent seats or bench type seats two buckles can be mounted on a single fixing bracket which can be such that the buckles can be folded into the seats when not in use.

5 Claims, 16 Drawing Figures

Patented March 27, 1973

3,722,909

6 Sheets-Sheet 1

Inventor
MARK EDWARD ESNER
By
Shoemaker and Mattare
Attorneys

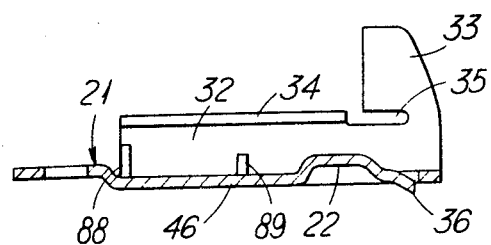
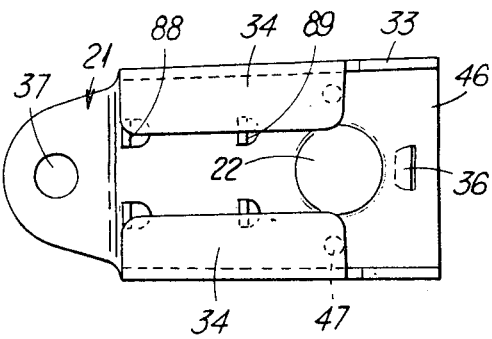
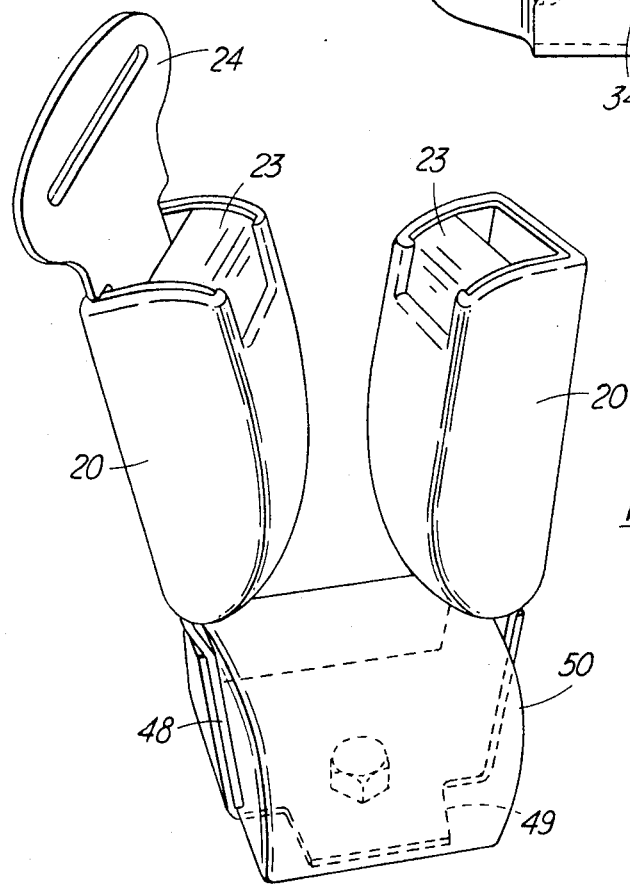

Patented March 27, 1973
3,722,909
6 Sheets-Sheet 4
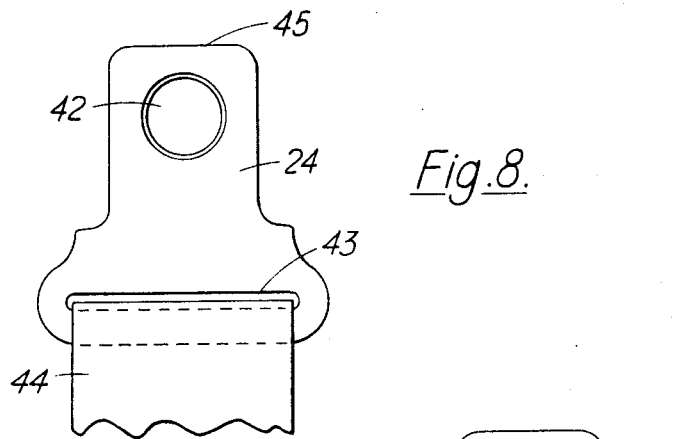
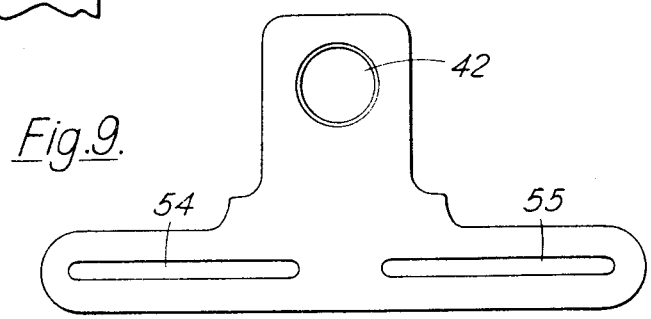
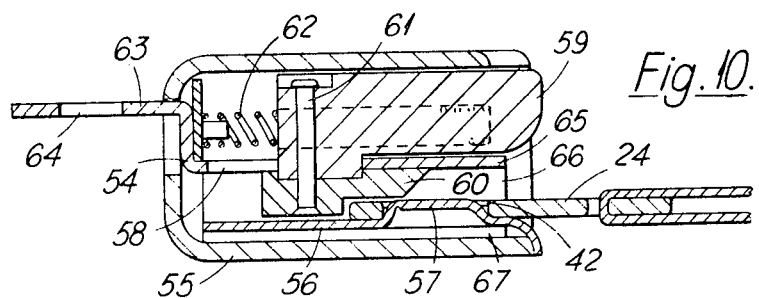
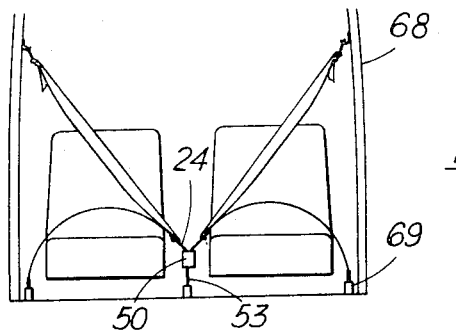
Inventor
MARK EDWARD ESNER
By
Shoemaker and Mattare
Attorneys Patented March 27, 1973 3,722,909

6 Sheets-Sheet 6

Inventor
MARK EDWARD ESNER
By Shoemaker and Mattare
Attorneys

VEHICLE SAFETY BELTS AND HARNESSES AND BUCKLES FOR THEM

This invention relates to safety belts and harnesses and buckles for them as are used on road vehicles and aircraft. The object of this invention is to provide a harness or belt including a two-part buckle which will be cheap to produce, effective in use, in which the two parts of the buckle can be connected using one hand only and which can be used either as a single unit for connecting the parts of the safety belt or harness to each other or for connecting the belt or harness to a vehicle, or made or mounted in groups of two or more to accomodate a number of belts or harnesses used by wearers in adjacent seats in a vehicle or the strap ends of two or more straps from a single belt or harness.

The invention covers a safety belt or harness including a two-part buckle in which one part comprises a plate having one or more apertures or projections or apertures and projections and the other part comprises a unit having one or more projections or apertures or projections and apertures which engage the aperture, apertures, projection and/or projections on the said one part to hold the two part of the buckle together, and a slidable member which is spring pressed into a position in which it forms part of one end or side of the said unit and holds the aperture or apertures and projection or projections on the two parts of the buckle in the engaged position, the said end or side of the said unit including a slot or mouth where the said plate enters the said unit.

The invention also covers a safety harness for a vehicle fitted with a buckle as defined above and a vehicle fitted withone or more of the said buckles.

The slidable members of the buckles may be movable either by hand or by the said plate from its position in which it forms part of the end or side of the said unit.

Each part of the buckle can be provided with means by which a strap or straps of a safety belt or harness can be attached to the buckle, or the means can be provided on one part of the buckle only, the second part being connected directly or indirectly to a vehicle.

Figure 2:
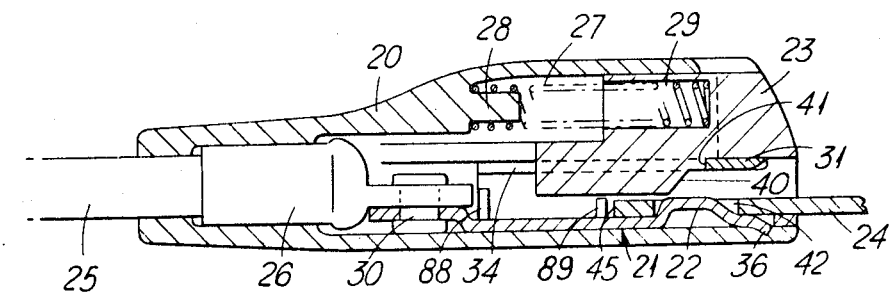
Figure 3:
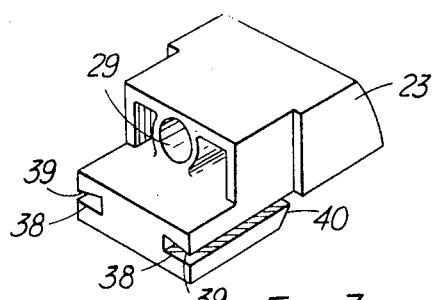
Figure 7:
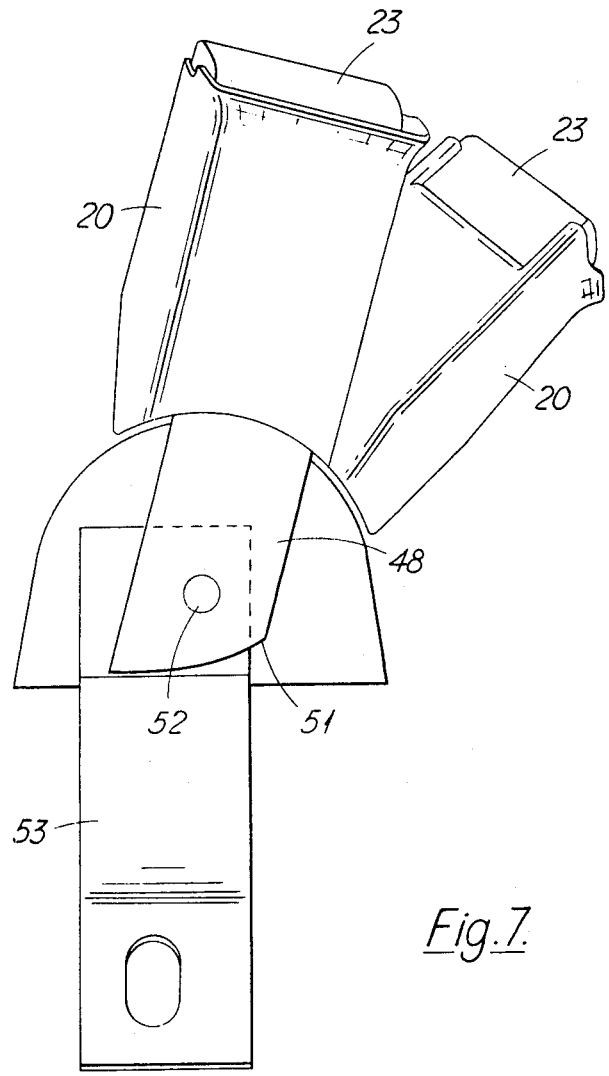
Figure 12:
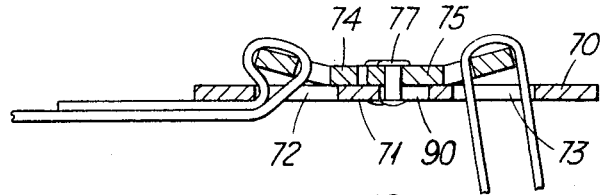
Figure 13:
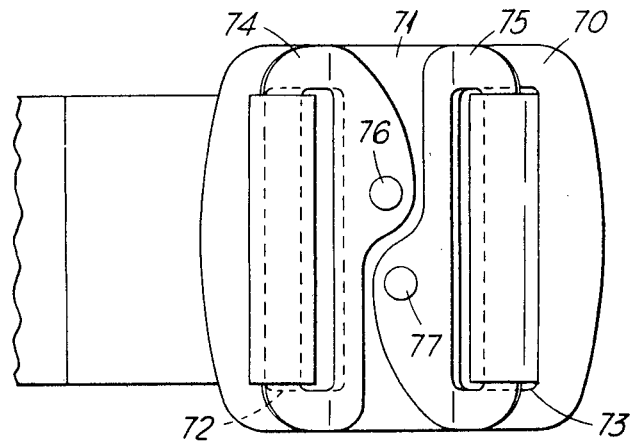
Figure 15:
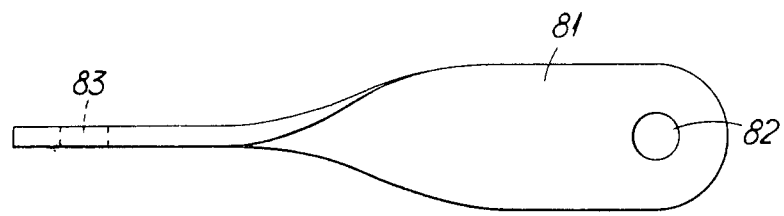
Figure 16:
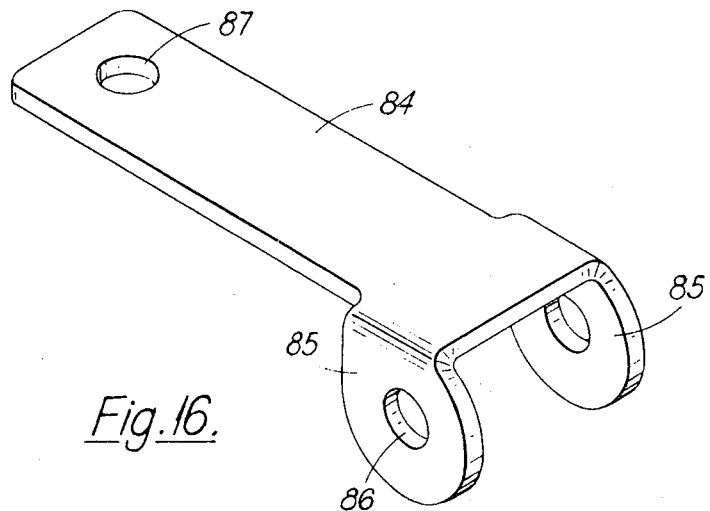

Buckles according to the invention are described hereinafter in which provision is made for attaching a strap or straps to one part of the buckle only. The forms are described with reference to the accompanying drawings of which FIG. 1 shows one form of unit for the buckle according to the invention, FIG. 2 is a section through the unit shown in FIG. 1, FIG. 3 is a rear view of the press button of the unit shown in FIGS. 1 and 2, FIGS. 4 and 5 are views of the channel member of the unit shown in FIGS. 1 and 2, FIGS. 6 and 7 are views of two buckles according to the invention with plate fixings and assembled on a twin fitting, FIGS. 8 and 9 show two forms of plate for use with the units shown in FIGS. 1, 2, 6, and 7 FIG. 10 shows a modified form of the units shown in FIGS. 1, 2, 6, and 7 FIG. 11 shows a twin fitting as shown in FIGS. 6 and 7 in position on a road vehicle, FIGS. 12 and 13 shows a double snubber which could be used with the buckle shown in FIGS. 1, 2, 6, 7 and 10, FIG. 14 shows an alternative form of plate for use with a double snubber and FIGS. 15 and 16 show forms of bracket for connecting the buckle to bench type seats.

The buckle shown in FIGS. 1 to 5 and 8 comprises a plate 24 with an aperture 42 and unit having a casing 20 holding a channel 21 with a retaining bump 22 and a press button 23. The buckle in this embodiment is provided with a cable 25, which could be a plastics coated seven stranded metal cable to provide a substantially rigid support for the buckle. The cable 25 is fixed in any suitable manner to lug 26. Lug 26 is connected by rivet 30 to channel 21, a suitable hole 37 being provided in the channel 21 for the rivet 30. The channel 21 has a base 46, turned up sides 32, the front parts of which remain at right angles to the base 46, to form wings 33, and the rear parts of which are bent parallel to the base to form guide rails 34. A slot 35 is provided between the ends of the guide rails 34 and the wings 33 to house a retaining bar 31 which extends across the channel and into the walls of the casing 20. The channel 21 has a mouth defined by the base 46, the sides 32, and the retaining bar 31, into which the end of plate 24 can be slid. The base of the channel is provided with back stops 88 and 89 for the press button 23 and plate 24 respectively and bump 22 of circular shape to fit the aperture 42 in the plate 24, the bump 22 having a radial surface towards the front of the channel to allow the plate 24 to be slid onto the bump 22 with ease. A tongue 36 is bent downwards from the base 46 to assist the fixing of the channel into the casing and two holes 47 are provided in the base for the same purpose.

The press button 23 forms one end of the unit adjacent the mouth of channel 21 into which plate 24 is inserted. The press button is provided with channels 38 in its sides which slide on the guide rails 34 of channel 21 the channels 38 being cut away as shown at 39 to give angular relief to allow for deflection of the channel 21. The press button 23 has a vertical edge at 41 which engages the retaining bar 31 to prevent the press button 23 leaving the casing 20. A spring 27 fits onto projection 28 on the casing 20 and into a hole 29 in the press button 23 to press the button 23 into its normal position as one end of the unit. The part of the press button 23 below the channels 38 is provided with a wedge shaped face 40 to guide the front edge 45 of the plate 24 towards the base 46 of channel 21 when the hole 42 of plate 24 is over bump 22. In operation, the plate 24 is pressed into the mouth of the unit below the face of the press button 23 and its end 45 presses against the face 40 of the press button and forces the press button 23 into the casing against the pressure of the spring 27. When the edge of the aperture 42 in plate 24 passes over the bump 22 in the channel 21, the wedge shaped face 40 of the press button 23 guides the front of the plate 45 into the space below the press button until end 45 of the plate meets stops 89. The spring 27 then moves press button 23 back into its normal position so that the plate 24 is tilted into a position parallel to the base 46 of channel 21 and is locked in the casing.

To release the plate 24, the press button 23 is moved into the casing until it meets back stops 88, in which position the edge 40 is clear of the front 45 of the plate 24. The plate 24 is tilted away from the base 46 of channel 21, either manually or by pull on the strap 44 attached to the plate. Release of the press button allows the spring 27 to move the press button back to its normal position, the face 40 engaging the end 45 of the plate 24 forcing the plate from the casing if it has not already moved away.

The mouth of the unit can be flared if desired.

If the buckles are used for adjacent seats on a vehicle, as shown in FIG. 11, a twin mounting as shown in FIGS. 6 and 7 could be used. The buckles in these embodiments are provided with stems 48, instead of cables 25, and the stems are rotatably mounted on spindle 52 to allow the casings 20 to be moved through some 30 degrees or so to give an adjustable position for the buckle mouth. The angle of the buckle can be adjusted by hand, or the buckle can be coupled to the seat so that when the seat is moved backwards or forwards the angle of the buckle is adjusted automatically. The mounting stems 48 are suitably shaped as at 51 to allow for movement of the buckle.

The twin mounting 49 can be provided with a plastics cover 50 and fixed to the floor of the vehicle (FIG. 6) or can be fixed on a short stem or bracket 53 (FIGS. 7 and 11) to bring the buckles nearer the seat level.

Two buckles can be mounted on a bracket comprising a swaged tube which is flattened at each end and drilled to accommodate, at one end a bolt for fixing the bracket to the floor, and at the other end a bolt to pass through the flattened end and holes 37 on channels 21 (FIG. 5) of two brackets, one bracket being mounted on each side of the tube. The floor end of the bracket is bent so that the bracket stands at an angle of about 45 degrees to the floor and the corners can be bent towards the floor to prevent movement between the bracket and the floor.

Any of the floor mountings can be made resilient if desired.

If buckles are used with bench seats, they can be mounted on a bracket as shown in FIG. 15 or FIG. 16 so that the buckle can be folded back into the bench seat when not in use. The bracket of FIG. 15 comprises a plate 81 with holes 82 and 83. The buckle is pivotted to the bracket by a rivet passing through hole 82 and hole 37 in channel 21. (FIG. 5). The bracket is connected to the center of a bench seat by a bolt passing through hole 83. The bracket shown in FIG. 16 comprises a plate 84 with ears 85. The ears 85 each have a hole 86 so that more than one buckle 20 can be joined to the bracket for example two buckles can be connected by joining one buckle to each ear by means of rivets through holes 37 in channels 21, or if the bracket is to be used with one buckle only, the buckle can be provided with a channel 21 with a pair of ears, each being pierced, so that a single buckle can be joined to the bracket 84 by a bolt passing through the holes 86 and the holes in the ears of the channel. The bracket is connected to the bench seat by passing a rivet or bolt through hole 87 in the bracket and connecting it to a suitable fixing on the seat. In both cases the buckles can when not in use be folded back into the seat about the pivots through the hole in channel 21, or about the holes in the brackets, so that the buckles are stored away when not required.

The plate 24 of the buckle can be provided with an aperture 43 to which a strap 44 of the seat harness can be attached, or with more than one aperture, for example, two apertures 54 and 55 as shown in FIG. 9. The strap 44 (FIG. 8) can form both the lap and chest strap of a harness, or can be a short strap connected to a becket or snubber to which the lap and chest straps are connected. A suitable snubber could be a double snubber as shown in FIGS. 12, 13, and 14 referred to hereinafter, the strap 44 being adjustable at one snubber and the harness strap adjustable at the second.

In the embodiments described above the fixing lug on the channel 21 has been in the same plane as the bump 22. For some positions in a vehicle it is not possible to arrange the fixing in line with the pull from the harness and an embodiment of the invention for such a position is shown in FIG. 10. In this embodiment the channel 54 has a base 65 which forms a central partition in the casing 55 and the bump 57 which fits the aperture 42 in plate 24 is formed on a separate plate 56 which is held in the turned down arms 66 of the channel 54 by protrusions not shown which fit into recesses in the arms 66, and/or flat bottom 67 of the channel 54. The base 65 of the channel 54 is provided with a central slot 58 in which the press button 59 slides, the press button being made in two parts 59 and 60 which ride respectively on the upper and lower sides of channel base 65. The two parts 59 and 60 are secured together by fixing 61. The press button is pressed by two springs 62, one on either side of the fixing 61. The channel, and so the buckle, is held to the vehicle by lug 63 which is provided with a fixing aperture 64.

To adjust the lengths of the straps of the harness manually controlled adjusters can be provided for example, a snubber fitted to the plate 24, a snubber at the upper vehicle fixing 68, (FIG. 11) and/or the lower fixing 69, or a snubber carried by the harness straps, or the straps can be adjusted automatically by spring wound reels with inertia or manual controlled brakes. If a double snubber is used it could be of the design shown in FIGS. 12 and 13. This adjuster comprises a frame 70 with a central part 71 separating two apertures 72 and 73. Snubbers 74 and 75 are fixed by rivets 76 and 77 respectively to the central part 71 of the frame, the central part 71 being provided with elongated holes as 90 to allow the snubbers to slide relative to the frame and to the apertures 72 and 73 for the straps of the harness. The arrangement allows for separate adjustment of two straps on which the pull is in opposite directions. In the FIG. 12 the snubber 74 is in the locking position of the snubber and the snubber 75 in the strap adjusting position.

Figure 14:
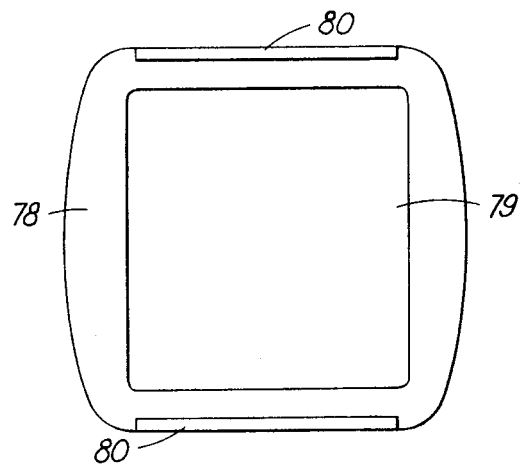

Instead of two apertures a frame 78 with one aperture 79 only can be provided as shown in FIG. 14. In this case the snubbers are arranged to slide in channels provided by flanges 80 on the sides of the frame.

Other forms of double snubber can of course be used or the two straps can be adjusted by separate snubbers or by passing both straps through a single snubbing buckle. As mentioned above a snubber could be mounted on a short strap carried by the plate 24 so that the snubber is nearer the lap of the wearer.

The two strap plate arrangement shown in FIG. 9 is particularly useful if it is required to separate the positions of pull of the two straps of a harness to provide for the lap strap to hold the legs and chest strap to pass across the pelvis. In some cases it is desirable for the two straps to be sepatately fitted to the buckle. This could be done by ending one of the straps in a becket through which the plate at the end of the second strap is passed before the plate is inserted in the buckle. Or the buckle could be provided with separate plate for each strap and separate bumps for each plate to engage, a single press button, or separate press buttons being provided to hold the plates within the buckle.

. The buckle of this invention is particularly adaptable for use with systems in which a warning is given if an attempt is made to start the vehicle before the safety harness has been fixed, or where some mechanical or electrical equipment is provided to prevent the vehicle being started before the safety harness has been properly adjusted. Since the plate on the safety harness must be pressed into the buckle, and held by the buckle in the locked position, a switch within the buckle can easily be arranged to be operated by the plate when in the connected position, the switch controlling the warning or prevention system. With the buckle mounted near to the floor of a vehicle by means of a bracket or cable, the electrical connections required from the buckle can be provided easily and without trailing wires.

I claim:

1. A safety belt of harness comprising a two part buckle, one part being connected to a fixed part of a vehicle, the other part being connected to one end portion of a belt, the other end portion of the belt being connected to the vehicle, one part of the buckle comprising a housing connecting means associated with the housing for connecting the one part to the vehicle, the housing having a slide mounted therein, the slide being the operable member to one position to allow release of the other part of the buckle and to another position to lock the two parts together, resilient means engaging the housing and the slide to force the slide into locking position, the slide having a first face portion engageable to operate the slide to the release position and a second face portion spaced inwardly and downwardly from the first face portion, a channel within the housing, the channel having a base, side walls extending upwardly normal to the base, flanges on each side wall extending inwardly in spaced relationship over the base and parallel thereto, the base having a means thereon engaging the other part of the buckle to hold the two parts together in holding position, the slide having opposed side wall portions provided with slots, the slots receiving the flanges of the channel and guiding the slide in its movement, the housing having aligned openings in the side walls thereof, the channel side walls having slots therein adjacent the forward end of the flanges, the slots being aligned with the housing side wall openings, retaining means extending through the housing side wall openings and the slots to retain the channel and slide within the housing, the slide having a shoulder thereon between the first face portion and the second face portion engaging the retaining means when forced forward by the resilient means, the other part of the buckle having means engaging the means on the base of the channel to hold the two parts together, the second face portion extending over the interengaging means on the base of the channel and the other part of the buckle and preventing the disengagement of the interengaging means.

2. A safety belt or harness for a vehicle including a two part buckle as claimed in claim 1 in which the buckle is connected to the vehicle by a substantially rigid cable directly to the vehicle.

3. A safety belt or harness for a vehicle including a two part buckle as claimed in claim 2 in which the said connecting means is mounted so that the said buckle can be swung about the mountings as the position of a seat in the vehicle is being moved.

4. A safety belt or harness for a vehicle including a two part buckle as claimed in claim 1 in which the effective lengths of the straps of which the belt or harness is comprised can be adjusted by snubbers carried by the straps.

5. A safety belt or harness for a vehicle including a two part buckle as claimed in claim 1 in which the said connecting means is mounted so that the said buckle can be swung about the mountings as the position of a seat in the vehicle is being moved.

* * * * *